Nov. 9, 1965 D. NICOLL ETAL 3,216,174
APPARATUS FOR CANNING NUCLEAR REACTOR FUEL ELEMENTS
Original Filed Aug. 2, 1961 5 Sheets-Sheet 3

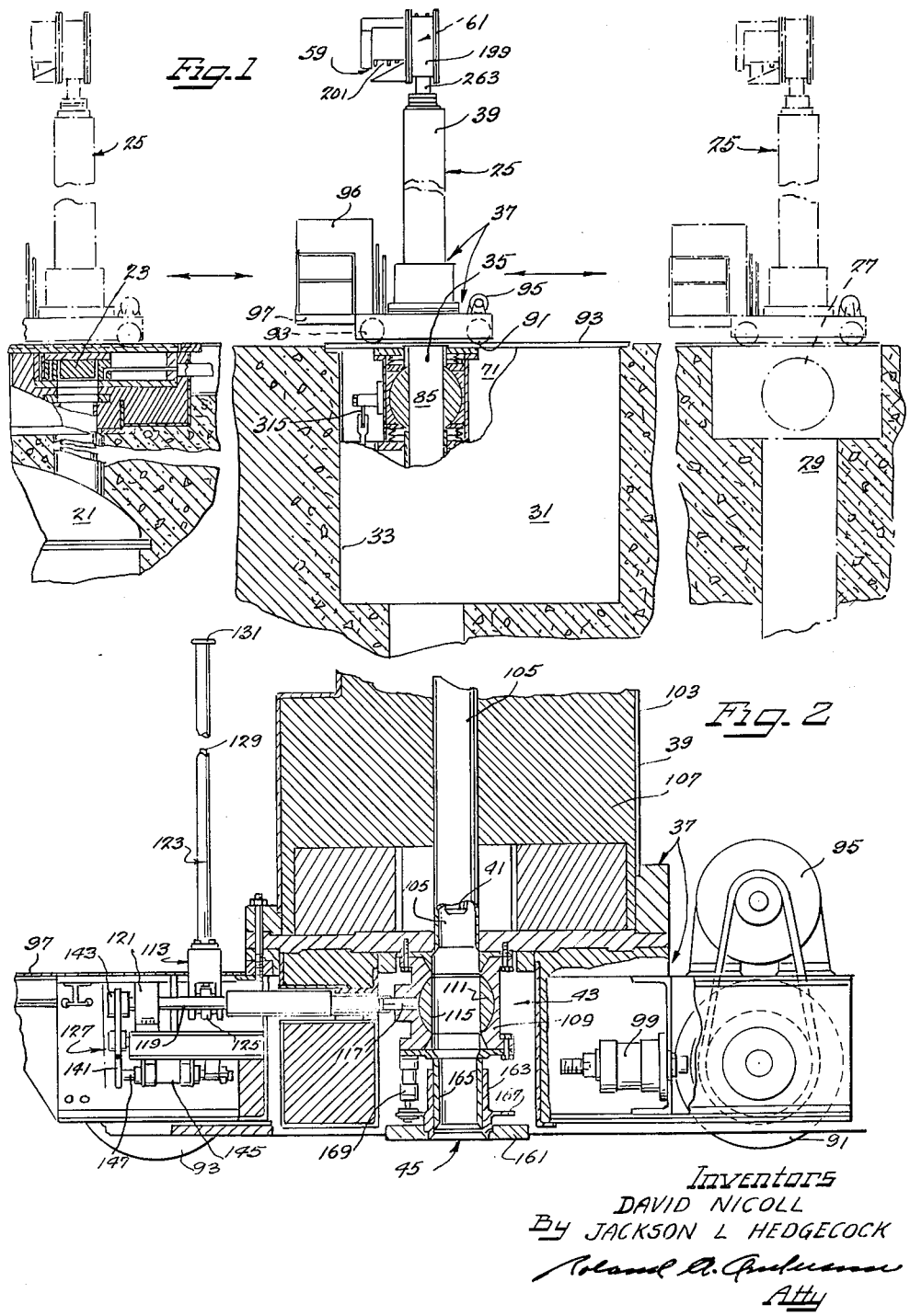

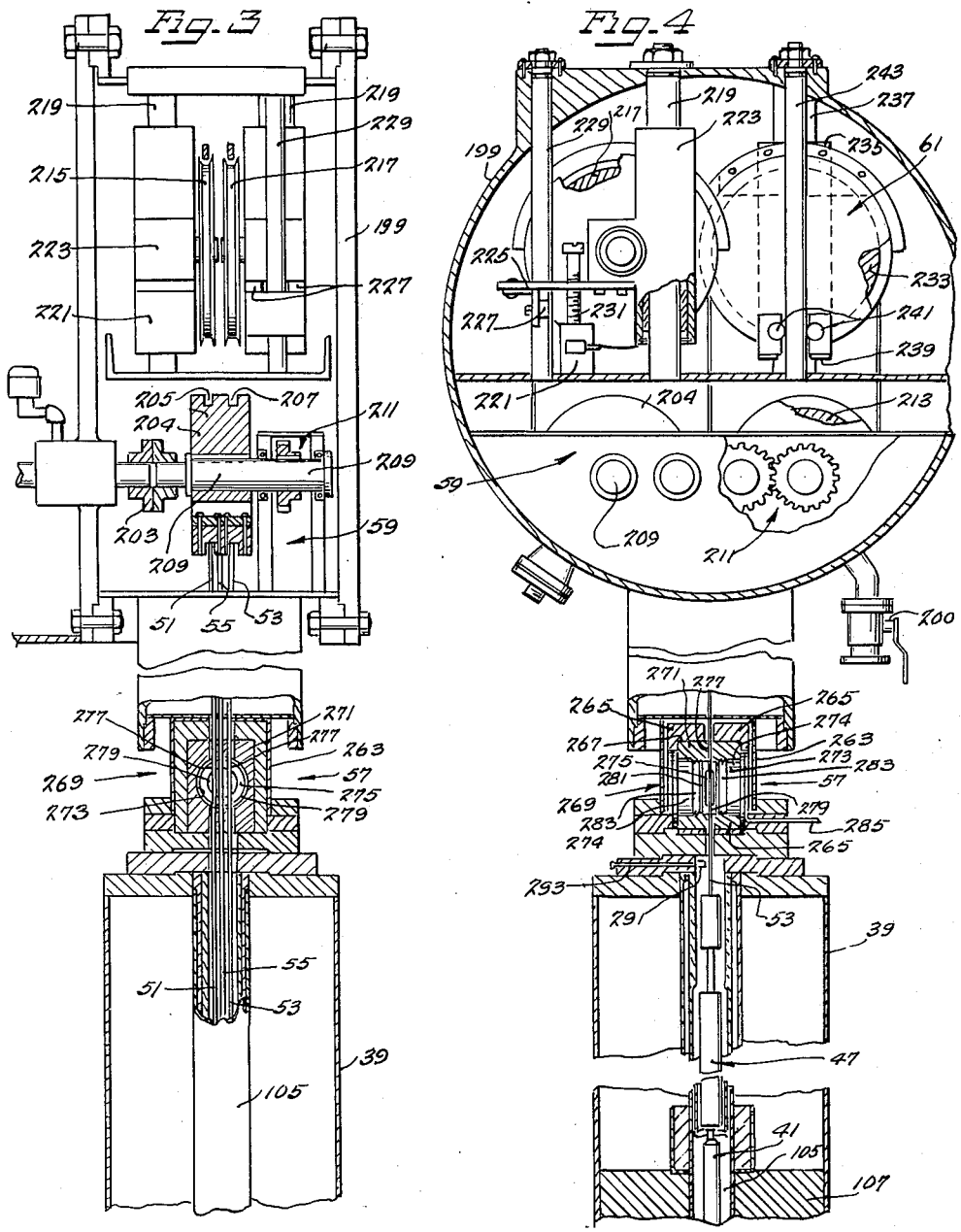

Inventors
DAVID NICOLL
BY JACKSON L HEDGECOCK
Atty

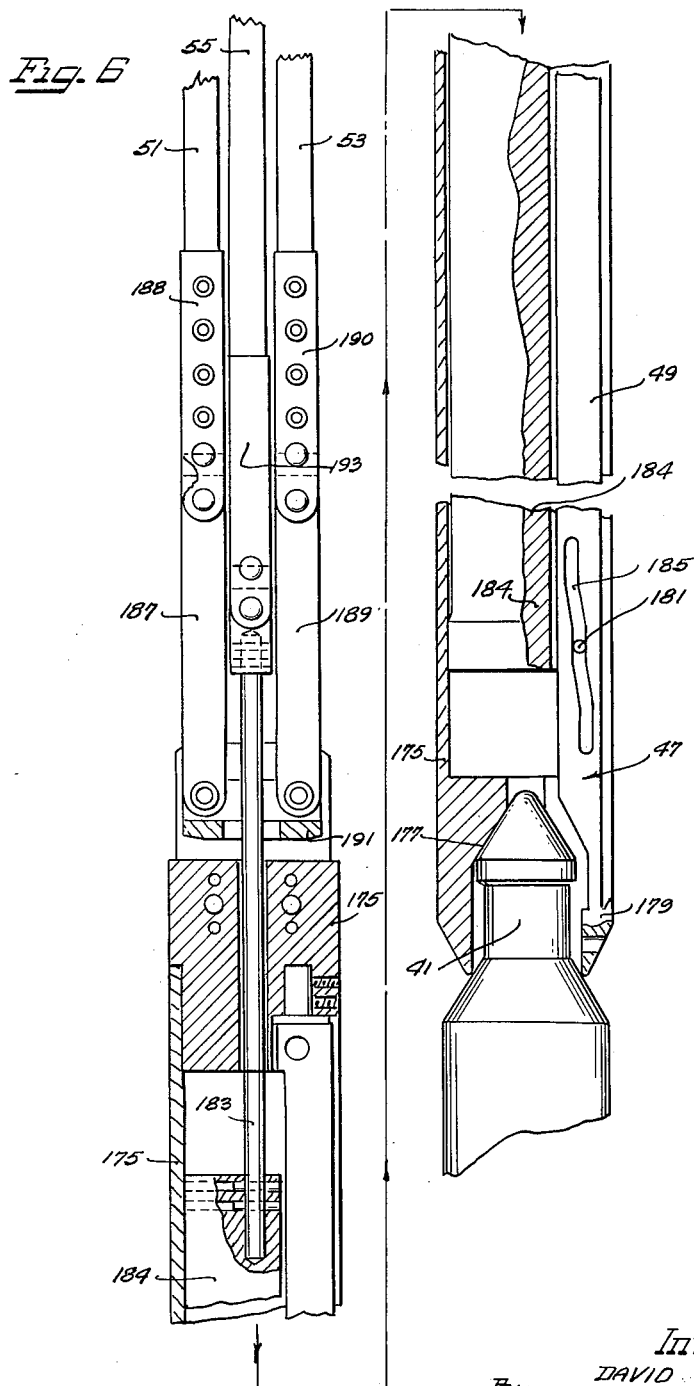

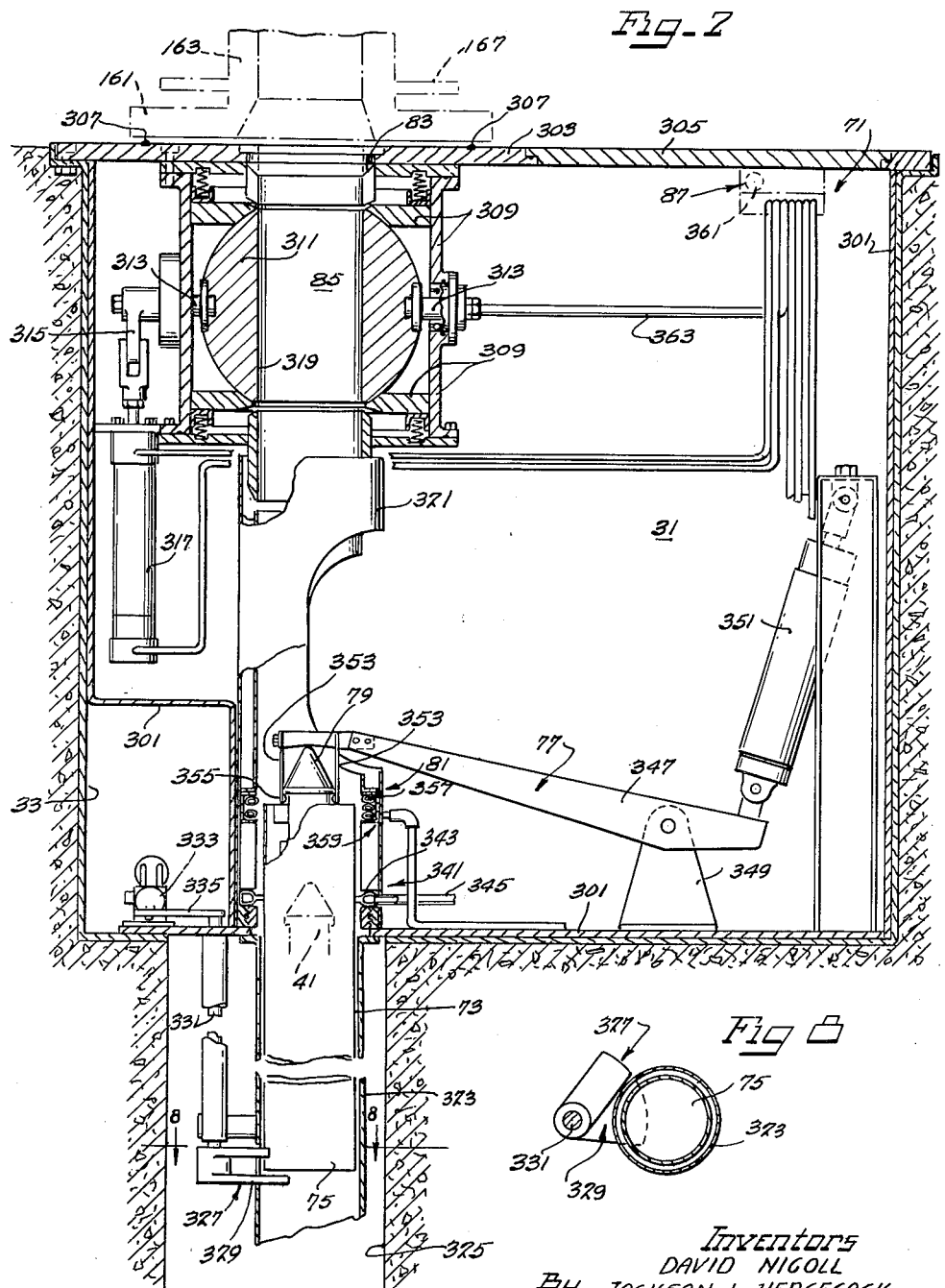

United States Patent Office 3,216,174
Patented Nov. 9, 1965

3,216,174
APPARATUS FOR CANNING NUCLEAR
REACTOR FUEL ELEMENTS
David Nicoll, La Jolla, and Jackson L. Hedgecock,
Encinitas, Calif., assignors to the United States of
America as represented by the United States Atomic
Energy Commission
Original application Aug. 2, 1961, Ser. No. 128,908,
now Patent No. 3,137,397, dated June 16, 1964.
Divided and this application Mar. 17, 1964, Ser. No.
356,689
7 Claims. (Cl. 53—80)

The present application is a division of our copending application S.N. 128,908, filed August 2, 1961, issued as U.S. Patent No. 3,137,397 on June 16, 1964.

The invention relates generally to nuclear reactors and to equipment for handling fuel elements, or the like, which are associated with nuclear reactors. More particularly, the invention relates to apparatus for disposing of "spent" fuel elements removed from a nuclear reactor.

In any nuclear reactor which is intended to operate over an extended period of time, such as for instance, a reactor which is to be utilized for the generation of electrical power, the reactor facility should be constructed to provide for removal and disposal of "spent" fuel elements and for recharging of the reactor with new or unused fuel elements. Such installations preferably include reactor vessels having one or more access ports enabling insertion and removal of fuel elements and other equipment. In addition, temporary storage facilities should also be provided for new fuel elements which are to be loaded into the reactor and for "spent" fuel elements which are removed from the reactor.

In general, some of the problems associated with charging of fuel elements into a reactor include preventing exposure of the surrounding environment to contaminated gases or particles incident to opening of the reactor, either to remove or replace a fuel element, and incident to loading or unloading of a fuel element at a storage area; shielding of either new or "spent" fuel elements during transportation between the reactor and associated storage areas so as to substantially prevent radiating the surrounding environment; and the "packaging" of "spent" fuel elements, as for instance, in a metal can or canister, to thereby permit removal from the site and eventual disposal.

The invention disclosed herein has for a general or principal object the provision of apparatus for "packaging" "spent" fuel elements so as to provide an effective solution to all of the above mentioned problems. Another principal object is the provision of cooperating apparatus for canning "spent" fuel elements while preventing escape into the surrounding environment of contaminated gases or particles from the reactor.

Another object of the invention is the provision of apparatus for canning "spent" fuel elements. Still other objects and advantages of the invention will become known by reference to the following description and the accompanying drawings of one embodiment of the invention.

In the drawings:

FIGURE 1 is a partially diagrammatic view of a reactor facility incorporating various of the features of the invention;

FIGURE 2 is an enlarged and partially sectioned, fragmentary view of the lower part of the charge machine shown in FIGURE 1;

FIGURE 3 is an enlarged front elevational view, partially in section, of the upper part of the charge machine shown in FIGURE 1;

FIGURE 4 is a partially sectioned, side elevational view of the structure shown in FIGURE 3, as seen from the right side;

FIGURE 6 is an enlarged view, partially broken away and in section, showing the grapple incorporated in the charge machine shown in FIGURE 1;

FIGURE 7 is an enlarged view, partially broken away and in section, illustrating the "canning" machine shown in FIGURE 1; and FIGURE 8 is a sectional view taken generally along line 8—8 of FIGURE 7.

Figure 5:
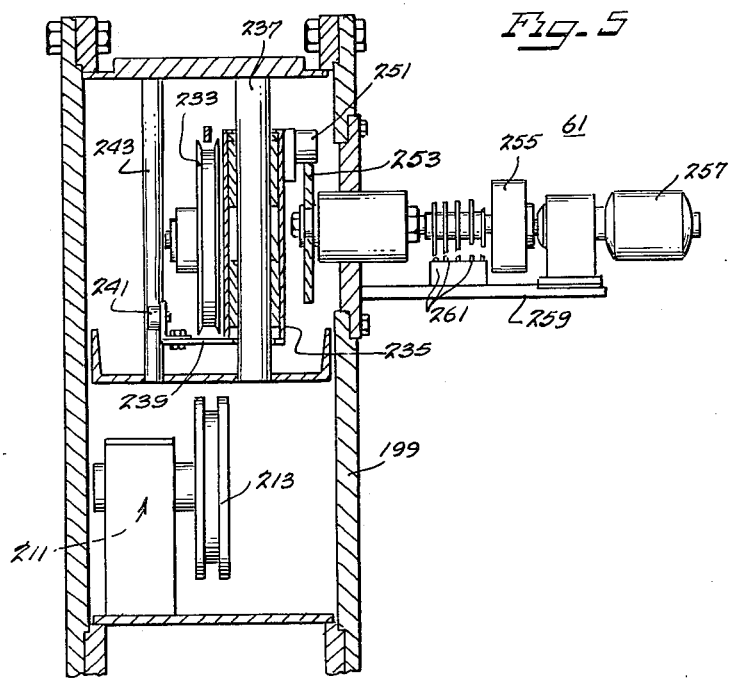
FIGURE 5 is a rear elevational view of a portion of the structure in FIGURE 3, with parts broken away and in section.

One arrangement incorporating various of the features of the invention is shown in FIGURE 1, wherein there is illustrated the upper portion of a vertically disposed reactor vessel 21 having an access or charge port 23, a charge machine or apparatus 25 which is movable along a track relative to the reactor access port 23, an access port 27 incorporated in a pick-up cell 29 located at one side of the reactor vessel and adapted for storing unused fuel elements, and a "canning" apparatus or machine 31 which is located in a pit 33 or the like, in the path of the charge machine track and intermediate the pressure vessel and the pick-up cell, and which also incorporates an access port 35. Although certain features of the invention are usable with other types of reactors, the disclosed arrangement has been particularly designed for use in connection with a high temperature, gas-cooled reactor and will be described with respect thereto.

The charge machine, as shown in FIGURES 1 and 2 includes, basically, a movable frame or support means 37 carrying a tubular housing or coffin 39 which is adapted to receive a fuel element 41. At its bottom, the housing is closed by an isolation valve 43 (see FIGURE 2) which is selectively adapted to provide access to the housing 39 from the bottom, thereby enabling insertion therein of a fuel element, and to seal the housing 39 so as to prevent the escape of any contaminated gas. Also located at the bottom of the housing is a coupling means 45 adapted for selective connection in fluid-tight engagement, with the access ports 23, 27 and 35 of the reactor, pick-up cell, and canning machine, respectively. Sealing engagement of the charge machine 25 to the access ports 23, 27 and 35 permits transfer to and from the charge machine of a fuel element without the escape of any contaminated gas into the surrounding environment or atmosphere through the joint or connection between the charge machine and any particular one of the access ports.

Carried within the housing (See FIGURES 4 and 6) is a grapple 47, which is movable through the isolation valve 43 to a position within the reactor, pick-up cell, or canning machine for depositing, or withdrawing, a fuel element. The grapple 47 includes a grappling means 49 at its lower end (see FIGURE 6) for gripping the upper end of the fuel element 41 and is supported by a series of flexible members 51, 53 and 55 (see FIGURES 3 and 6) which are operable to move the grapple, together with any load engaged thereby, and to afford opening and closing of the grappling means 49. In this regard, the supporting flexible members 51, 53 and 55 pass out of the grapple housing through a sealing means 57 (see FIGURES 3 and 4) at the top of the housing and are connected to a hoist mechanism 59 (see FIGURES 1, 3 and 4). Associated with the hoist 59 is a control and drive means 61 (see FIGURES 1, 4 and 5) for opening and closing the grapple.

Referring to the "canning" machine 31, this apparatus comprises (FIGURE 7) a fluid tight chamber 71 located in the pit 33 below the path of travel of the charge machine 25. Extending from, and forming a part of, the chamber 71 is a receptacle 73 for receiving an elongated tubular container or canister 75 adapted for receiving a "spent" fuel element 41 having one closed end and one open end. When the container is received in the receptacle 73, the open end is upwardly exposed within the chamber 71. Also incorporated in the chamber 71 is mechanism 77 for receiving a cap or cover 79 adapted to close the container 75 and for placing the cap 79 on the open end of the container. A sealing means 81 is also provided in the chamber for uniting the cap 79 to the container 75 so as to provide a mechanical connection as well as a hermetic seal.

As in the access ports associated with the reactor 21 and pick-up cell 29, the chamber 71 includes a mouth 83 having associated therewith an isolation valve 85 which is selectively operable to prevent the escape of gas from the canning machine 31, and to provide access to the receptacle 73 so as to permit placement therein of one of the containers 75 or of a "spent" fuel element 41 which is placed in the container. The chamber also incorporates purging means 87 for removing a contaminated or undesired atmosphere and for selectively replacing such atmosphere with a new atmosphere.

The coupling means 45, by which the housing 39 can be connected in fluid-tight relation to the access ports of the reactor 21, canning machine 31, or the pick-up cell 29, comprises a pressure plate 161 which is fixed to the outer one of a pair of fluid-tight, telescopically joined tube sections 163 and 165. The inner section 165 is fixed to the bottom of the socket 109 in axial alignment with the cavity 105 in the housing 39. In order to effect movement of the outer telescopic tube section 163 relative to the inner telescopic tube section 165, so as to position the pressure plate 161 in sealing engagement with the gasket associated with the selected access ports, the outer telescopic tube section 163 is provided with a fixedly extending collar 167 which is connected to the ends of the plunger portions of a plurality of pneumatic rams 169, which rams have their cylinders fixed to a flange welded to the cylindrical tube section 165 which is attached to the under surface of the socket 109. Thus, when the pressure air is supplied to the rams 169, the pressure plate 161 is moved downwardly from the isolation valve 43 in order to provide a fluid-tight seal with the adjacent access port.

*Operation of the charge machine*

In the loading of a "spent" fuel element into the charge machine 25 from the access port 23 of the reactor 21, the charge machine is first located over the access port and the pressure plate 161 is lowered to sealingly engage the port gasket to provide a fluid-tight seal between the charge machine 25 and the reactor access port 23. The respective isolation valves of the charge machine 25 and of the access port 23 are then opened to permit lowering of the grapple 47 into the reactor for engagement with a "spent" fuel element previously located under the access port. The fluid-tight seal between the charge machine 25 and the access port 23 prevents escape of the contaminated coolant gas to the surrounding environment. Further, there is preferably provided means (not shown) for purging the space between the valves at the bottom of the charge machine and the access port.

Lowering of the grapple 47 into the reactor is controlled by the hoist motor 201 which is provided with a suitable sytsem for indicating and controlling the position of the grapple within the charge machine 25 and within either the reactor 21 or the pick-up cell 29. The grapple actuating motor 257 serves to provide that the gripping members are open when the grapple engages the fuel element 41 and to provide for subsequent movement of the gripping members to their gripping positions. As previously mentioned, movement of the gripping members 49 relative to their "gripping" positions results from vertical movement of the idler pulley 233 along the upright post 237. When the "spent" fuel element is secured by the gripping members 49, the hoist motor 201 then operates to raise the fuel element into the shielded housing 39.

When the "spent" fuel element is fully positioned in the housing 39, the isolation valves in the charge machine 25 and in the access port 23 are then closed. The space between the isolation valves is then purged of contaminated coolant gas and refilled with air by means of the purging equipment associated with the access port. The pressure plate 161 is then lifted, breaking the seal between the access port 23 and the charging machine 25.

The loading operation of an unused fuel element from the pick-up cell 29 is substantially the same as the loading of a "spent" fuel element from the reactor 21.

Unloading of a "spent" fuel element from the charge machine 25 to the canning machine 31 takes place after the charge machine is located over the canning machine access port 35 and the pressure plate 161 is lowered to sealingly connect the charge machine to the canning machine. After purging both isolation valves 43 and 85 are opened and the hoist motor 201 is operated to lower the "spent" fuel element into the container 75 in the chamber 71. When the fuel element 41 is fully disposed in the container, the grapple-actuating motor 257 raises the idler pulley 233 to open the gripping members 49. When the fuel element 41 is disengaged, the grapple 47 is again hoisted into the housing 39. At this point, the isolation valve 43 in the charge machine is closed and any contaminated coolant gas which escaped from the housing 39 into the chamber 71 is purged and replaced with air. At the same time, the contaminated coolant gas in the space between the isolation valves 43 and 85 is also replaced with air.

The isolation valve 85 in the canning machine 31 is then closed, and the pressure plate 161 is then raised, thereby breaking the seal between the charge machine and the canning machine. Escape of contaminated coolant gas to the surrounding environment is prevented by the previous expulsion of contaminated gas and subsequent replacement of "clean" air in the space between the isolation valves.

The charge machine can then be moved either to the access port 23 of the reactor 21 to remove another "spent" fuel element or to the access port of the pick-up cell to deliver an un-used fuel element to the reactor.

*The canning machine*

As shown in FIGURES 1 and 7, the canning machine is located in the pit 33, which is formed in concrete and located below the path of travel of the charge machine 25. The air tight chamber 71 in the pit is generally formed by a metal lining 301 and a cover 303 including a loading port or manhole 305 which facilitates loading of caps 79 into the cap receiving and placing means 77. The cover 303 also includes the mouth or opening 83 which forms a part of the access port 35 and which leads to the isolation valve 85. Surrounding the mouth 83 is a circular gasket 307 adapted for sealing engagement by the pressure plate 161 of the charge machine 25. A plug or manhole (not shown) is also provided for removable seating in the mouth of the access port.

The isolation valve 85 functions, when closed, to seal the chamber 71 against the escape of fluid, and, when opened, to permit entry therein of the container 75, and of a fuel element from the charge machine 25. When the charge machine 25 is sealingly engaged with the cover 303, and the isolation valve 85 is open, the atmosphere in the charge machine cavity 105 can be purged by the purging means 87 associated with the canning machine 31.

Although isolation valves of various construction can be used, the disclosed valve 85 is of the socket and ball type, including a socket 309 adapted for receiving a valve element 311 of spherical or ball formation. The spherical valve element includes a pair of opposed trunnions 313 which are mounted in the socket 309 to facilitate rocking of the valve element about a horizontal axis. One of the trunnions is connected by a crank arm 315 to a ram 317 which is operable to rock the valve element between an open position and a closed position. In this last regard, the valve element 311 includes a bore 319 extending perpendicularly to the horizontal axis, which bore is vertically positionable to open the valve so as to permit entry into the chamber of the containers 75 and "spent" fuel elements. When the bore is disposed horizontally, the isolation valve is sealingly closed.

Extending downwardly from a position below the isolation valve 85 is a vertical sleeve 321 which extends to a position adjacent the receptacle 73 and is adapted for guiding the containers 75 and the "spent" fuel elements into the receptacle. The receptacle 73 constitutes a guide tube 323 located in an enlarged conduit 325 leading from the bottom of the pit 33 to a storage area (not shown) in which the "canned" fuel elements are retained until such time as their radiation level will permit safe disposal.

Extending within the conduit and positionable into the guide tube is a support means 327 for holding the container at a proper position within the guide tube 323 so that the open, upper end of the container is in position for receiving a cap 79 from the cap receiving and placing means 77 and in position for operation thereon by the means 81 which effects union of the cap 79 with the container 75.

While various arrangements can be used for supporting the container 75 in proper position within the receptacle 73, the disclosed construction utilizes a pawl or cam 329 which is mounted on a vertical rock shaft 331 extending in parallel relation to the guide tube 323. The shaft 331 is carried by suitable bushings and bearings and is rotatable to provide movement of the container-supporting cam 329 relative to a position for supporting the container, by means of a ram 333 and a crank arm 335 located in the pit 33 exteriorly of the air tight chamber 71.

Escape of gas from the chamber 71 in the annular area between the container 75 and the guide tube 323 is prevented by a sealing means 341 which connects the outer surface of the container with the guide tube. The disclosed construction utilizes a pneumatic expansion seal in the form of a resiliently expandable toroidal member 343 which is inflatable to effect a fluid-tight seal between the container and the guide tube. Suitable piping 345 leads from the inflatable member 343 to the exterior of the chamber 71 to provide for inflation and deflation.

As already mentioned, after a "spent" fuel element has been deposited in a container 75 which is received and supported in the guide tube 323, a cap 79 is placed in the upper, open end of the container and united to the container to provide a mechanical connection and an hermetic seal. The means 77 for placing a cap in the open end of the container includes a capping arm 347 which is mounted intermediate its ends on a pair of spaced brackets 349 for pivotal movement about a horizontal axis. Movement of the capping arm 347 about its horizontal axis is provided by an actuating ram or cylinder 351 which is pivotally connected to one end of the capping arm. At its other end, the capping arm 347 includes means for releasably gripping the cap. In the disclosed construction, this means includes a series of resilient blades or fingers 353, each of which includes, at its lower end, a rounded detent 355 which is adapted to be received in an annular groove in the cap 79.

In the disclosed construction, the cap 79 is united, by brazing, to the top of the container 75 by an electrical induction coil 357 positioned adjacent the top of the guide tube, which coil, when energized, provides sufficient heat to fuse an alloy between cap and container. The fusable alloy can be carried by either the cap or the container. As will be noted hereafter, brazing of the cap to the container takes place in an inert atmosphere, as the chamber 71 is filled with helium during the brazing operation. Suitable coolant means 359 surrounding the induction coil are also provided in the usual fashion.

After the charge machine 25 pressure plate is sealingly engaged with the gasket 307 and when both isolation valves 43 and 85 are open, the atmosphere in the chamber 71, as well as the atmosphere in the charge machine 25 can be removed by the purging means 87.

The purging means 87 includes a purge line 361, together with associated valves (not shown), and suitable gas sources (not shown) for replacing expelled atmosphere. Also included in the disclosed construction, is a valve purge line 363 by which means any atmosphere in the socket 309 and valve elements 311 can be replaced as desired.

*Operation of the canning machine*

The canning machine 31 is prepared for the canning of a "spent" fuel element by initially filling the chamber 71 with non-contaminated air. The cap-loading port 305 is then temporarily opened and the cap 79 is placed in the resilient gripping means at the outer end of the capping arm 347. Either previously or thereafter, the plug (not shown) is removed from the mouth 83 of the access port and the isolation valve 85 is opened to permit passing a container 75 through the chamber 71 into the guide tube 323. At this time, of course, the supporting cam 329 is positioned so as to supportingly engage the lower end of the container 75, thereby properly locating the container in the guide tube 323.

After the container 75 is lowered into the guide tube by suitable means, the pneumatic expansion seal 341 is filled with air to seal the container to the guide tube so as to prevent the escape of gas out of the lower end of the guide tube. At this time, if the cap loading port 305 has not already been closed and sealed, this is now accomplished. The chamber 71 and the container 75 are then purged of air and filled with helium. The charge machine 25 is then located above the access port and the pressure plate 161 is actuated so as to establish a fluid-tight seal between the charge machine 25 and the canning machine 31. After the charge machine 25 is sealed to the canning machine, the space between the isolation valves 43 and 85 is purged and then filled with helium.

The isolation valve 43 in the charge machine and isolation valve 85 in the canning machine are now opened for lowering of the "spent" fuel element into the canning machine. Opening of the isolation valves results in exposure of the chamber 71 to the contaminated coolant gas which occupied the housing in the charge machine when the charge machine was loaded with a "spent" fuel element at the reactor access port 23.

The helium previously supplied within the chamber 71 and within the space between the isolation valves 43 and 85 provides a helium atmosphere around the "spent" fuel element during lowering thereof through the chamber 71 and when located in the container 75. The helium atmosphere in the chamber 71 and in the container 75 also serves to provide an inert atmosphere during subsequent uniting of the cap 79 to the container 75. After the "spent" fuel element is deposited in the container 75, the grapple 47 is withdrawn into the charge machine and the isolation valve 85 is closed to seal the chamber 71.

The capping arm 347 is then actuated to position the cap 79 within the open, upper end of the container 75.

When the cap is thus positioned, the induction coil 357 is energized to effect uniting of the cap to the container. In the disclosed construction, the cap is brazed to the container. After the cap 79 has been effectively united to the container 75 to provide both a mechanical connection and a hermetic seal, the capping-arm ram 351 is energized to relocate the capping arm 347 in position for receiving another cap. The resilient characteristics of the gripping fingers 353 permit their disengagement from the cap 79 as the capping arm 347 moves to its "cap-loading" position. After the "spent" fuel element is sealed within the container 75, the contaminated gas in the chamber is evacuated by the purging means 87. At this time, and prior to refilling of the chamber with air, the hermetic seal between the cap and the container is preferably leak tested to insure against escape of subsequently contaminated helium gas from the container.

In order to prevent the escape of helium to the "spent" fuel element storage area and to prevent loss of helium to the surrounding environment when the chamber 71 is later opened to permit loading of another container and cap, the chamber 71 is cleared of helium and refilled with air. The "canned" fuel element can now be discharged after the pneumatic expansion seal 343 is collapsed and the supporting pawl 329 is moved away from the bottom of the container.

At any time after the grapple is withdrawn into the cavity 105 of the charge machine, and after closing of the isolation valve 85, the isolation valve 43 in the charge machine can be closed and the space between the closed isolation valves purged and refilled with "clean" air. The supply of "clean" air to the space between the isolation valves permits disengagement of the pressure plate 161 from the gasket 307 and removal of the charge machine 25 from the canning machine 31 without loss to the surrounding environment of the contaminated gas.

Although the foregoing description is generally confined to a handling of fuel elements, it should be understood that the charge machine and canning machine disclosed herein are not limited for use with fuel elements but are adapted for handling and canning various other components, as for instance, control rods and radiation samples. Accordingly, as used in the claims, the terms "fuel element" or "spent" fuel element are intended to apply to all such other components which may be associated with a reactor and are adapted for handling by the disclosed apparatus.

We claim:

1. Apparatus for canning spent fuel elements comprising a shielded fluid-tight chamber having an opening through the upper wall thereof, a conduit leading from the lower end of said chamber and adapted to receive a container having an open end, means in said conduit for releasably supporting the container in said conduit with the open end disposed in said chamber, means in said chamber for establishing a fluid-tight seal between said conduit and the container on said support means, additional means located in said chamber and operable to receive a metal cap and place the cap on the open end of the container, heating means located in said chamber and operable to braze the cap to the container so as to provide a mechanical and fluid-tight seal therebetween, valve means in position to selectively control communication through said opening in said upper wall of said chamber for sealing said chamber against escape of fluid and for permitting access to said chamber to enable loading of the container in said receptacle and depositing of a spent fuel element in the container, and purging means in said chamber which is operable to selectively replace the atmosphere in said chamber.

2. Apparatus for canning spent fuel elements comprising a shielded fluid-tight chamber having an opening in a first wall thereof, an opening in a second wall of said chamber adapted for insertion of an elongated container with an open end in alignment with said first opening in a position to receive a spent fuel element inserted therethrough, means for releasably supporting said container in said opening, means for establishing a fluid tight seal between said inserted container and said chamber, additional means in said chamber for receiving a metal cap in one position and transferable to dispose said cover to close said open ended container in a second position, heating means located in said chamber and operable to braze the cap to said container providing a mechanical fluid-tight seal therebetween, valve means positioned to selectively seal and control communication through said first wall opening into said chamber and to enable loading of the container in said second wall opening and depositing of a spent fuel element in said container, and purging means operable to selectively replace the atmosphere in said chamber.

3. Apparatus for canning spent fuel elements comprising a shielded fluid-tight chamber having an opening through the upper wall thereof provided with means for coupling to a spent fuel element transfer means, a conduit leading from the lower end of said chamber and adapted to receive a container having an open end, means in said conduit for releasably supporting the container in said conduit with the open end disposed in said chamber, means in said chamber for establishing a fluid-tight seal between said conduit and the container on said support means, additional means located in said chamber and operable to receive a metal cap in a first position and movable to a second position to place the cap on the open end of the container, electrical induction heating means located in said chamber and operable to braze the cap to the container so as to provide a mechanical and fluid-tight seal therebetween, valve means in position to selectively control communication through said opening in said upper wall of said chamber for sealing said chamber against escape of fluid and for permitting access to said chamber to enable loading of the container in said receptacle and depositing of a spent fuel element in the container, and purging means in said chamber which is operable to selectively replace the atmosphere in said chamber.

4. Apparatus as defined in claim 3 wherein said valve includes a socket having a pair of spherical seats substantially coaxially aligned with said upper wall opening, a spherical ball having a diametric bore and rotatably positioned in said socket seats, and means for rotating said ball to provide sealing and selective communication through said upper wall opening.

5. Apparatus as defined in claim 3 wherein said additional means located in said chamber includes an arm pivotally mounted for movement from said first to said second position, said arm being provided with resilient finger means for receiving said metal cap and with means for remotely actuating said movement from the first to second position.

6. Apparatus as defined in claim 3 wherein said means for sealing said container and conduit includes an inflatable toroidal member disposed between said container and guide tube.

7. Apparatus as defined in claim 3 wherein said electrical induction heating means includes an induction coil positioned circumjacent the capped end of said container.

References Cited by the Examiner

UNITED STATES PATENTS

| | | | |
|---|---|---|---|
| 1,790,787 | 2/31 | Badger | 53—83 |
| 2,014,597 | 9/35 | Staley | 53—89 |

TRAVIS S. McGEHEE, *Primary Examiner.*

FRANK E. BAILEY, *Examiner.*